Sept. 20, 1966   A. P. GOTTFRIED   3,273,930
SOIL-EXTRACTING IMPLEMENTS
Filed July 13, 1964
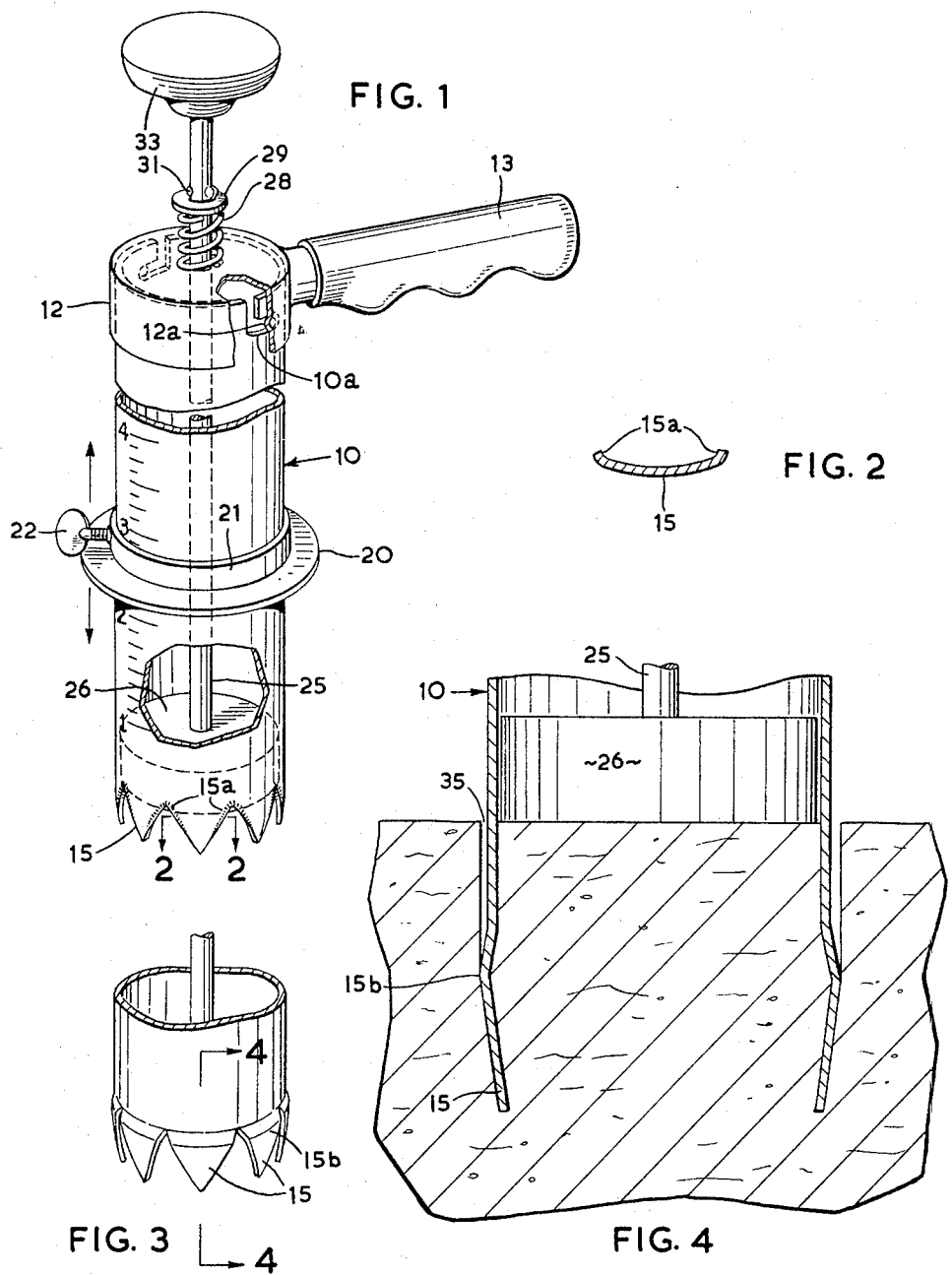
INVENTOR.
ADAM P. GOTTFRIED
BY Frederick C. Bromley
ATTY.

United States Patent Office 3,273,930
Patented Sept. 20, 1966

3,273,930
SOIL-EXTRACTING IMPLEMENTS
Adam P. Gottfried, 528 Bedford Park Ave.,
Toronto 12, Ontario, Canada
Filed July 13, 1964, Ser. No. 382,312
6 Claims. (Cl. 294—50.5)

My invention relates to implements used in gardens to facilitate the planting of seeds or bulbs, and more particularly to hand-operated devices for extracting and replacing soil at points where flower bulbs are planted.

One object of the invention is to provide an implement of the above character which is in the form of a long tube, positioned vertically while in use, with its lower end toothed for cutting into the soil to form a hole in which the bulb is planted, the toothed formation converging slightly to engage the core formed in the soil and permit its momentary removal while the bulb is planted.

A further object is to shape the units of the toothed formation with reinforcing side flanges which resist tendencies to deform or deflect the teeth in case they encounter stones or other hard objects during their cutting progress.

Another object is to form the teeth with expanded portions effective to slightly enlarge the hole as it is cut and make it easier to lift the implement out of it after the hole has been cut to a desired depth.

An additional object is to provide the implement with a gauge which is adjustable and calibrated to adapt the implement for cutting holes of different depths.

An important object is to design the novel implement along lines of sturdiness and simplicity.

A better understanding of the invention may be gained by reference to the accompanying drawing, in which:

FIG. 1 is a perspective view of the implement in the position of use, and broken away in places;

FIG. 2 is an enlarged section on the line 2—2 of FIG. 1;

FIG. 3 is a view similar to the bottom portion of FIG. 1, and showing a modification; and FIG. 4 is a magnified scetion of the modified portion on the line 4—4 of FIG. 3 after completing a cut into a bed of soil.

Referring specifically to the drawing, 10 indicates the body portion of the implement as a long tubular housing, usually about 1 foot long and 2 inches in diameter, made of light steel tubing. The housing is positioned vertically when in use, and its upper end receives a cap 12 as a closure. While the cap may be secured to the housing in any suitable manner, preferred securing means comprise nodules 12a projected inwardly from the side of the cap to co-operate with correspondingly-placed bayonet slots 10a made in the upper end of the housing 10. With the nodules seated in the slots 10a as shown in FIG. 1, the cap is held securely to the housing; and the implement is held for use by means of a handle 13 projected laterally from the cap.

In order to cut a hole in soil for the planting of a bulb, the lower end of the housing 10 is fashioned with a series of pointed teeth 15. Thus, down pressure on the implement with a slight twist will cause the teeth to cut a hole of any desired depth, and the housing to receive a core of soil in the bottom. FIG. 1 shows that the teeth 15 are slightly rounded to converge inwardly, whereby to exert a retentive hold on the core of soil contained in the bottom portion of the housing 10. Lifting the implement will now raise the core of soil out of the hole and leave the way clear for planting a bulb therein. It may now be pointed out that the base of each tooth 15 has inward flanges 15a at the sides, these tapering toward the point of the tooth. Such flanges lend the teeth 15 rigidity to resist tendencies to deform them when they encounter stones or other hard objects in the soil being cut.

The depth to which the implement may be depressed to cut the hole may be varied according to the depth at which the bulb is desired to be planted. A gauge to set the desired depth has the form of a ring 20 projected from a band 21 which is slidable on the exterior of the housing 10. The band receives a thumbscrew 22 directed to the side of the housing; and a scale of calibrations progressing upwardly is marked or stamped on the side of the housing for setting the gauge at a point where the desired depth in cutting the hole is reached when the ring 20 meets the surface of the soil.

FIG. 1 shows that a vertical rod 25 is centered in the cap and extends downwardly within the housing 10 to terminate with a piston 26. The rod is slidable in the cap, receiving a coil spring 28 above the same and a washer 29 above the coil spring; and lugs 31 crimped from the sides of the rod form stops above the washer 29. The rod receives a knob 33 at its upper end.

The spring 28 supports the piston 26 in the base region of the teeth 15, as seen in FIG. 1. When the implement is depressed to cut a hole in the ground, the rise of the soil core inside the housing 10 causes the piston to yield upwardly and make room for the core. After the implement, loaded with the soil core, is removed and the bulb planted in the hole, the latter is again filled with the soil core by depressing the knob 33 to eject the same. The downstroke of the rod eventually compresses the coil spring 28 and cushions the end of the piston stroke. After the soil core has been ejected the knob may be released, the coil spring then acting automatically to raise the piston to the original position.

FIGS. 3 and 4 show the teeth 15 modified to present an outward hump 15b before the base; and FIG. 4 shows that the series of humps render the hole slightly wider, as shown at 35, making it easier to remove the implement therefrom.

It is now apparent that the novel bulb planting implement is of a character to be held firmly with one hand for receiving downpressure and twisting movements to cut the hole in the soil to the desired depth. The next movement is to lift the implement clear of the hole for the deposit of the bulb with the other hand; and using the latter to depress the knob 33 completes the operation. The low setting of the gauge is for having the flowers bloom at a normal time, while raising the gauge to make a deeper hole will cause the flowers to bloom at a later time.

In conclusion, an important feature of the invention is the convergence of the teeth 15 to grip the soil core, as shown in FIG. 4. Further, the flanged form of the teeth enables them to be made thin and sharp, yet firm enough to resist bending or deforming tendencies. Further, the expanded form of the modified teeth near the base creates a leeway for the easy removal of the implement from the soil. Further, the gauge for setting of depth is very simple and easily adjustable. Finally, the spring for the piston rod supports the piston in the proper initial position, and cushions the return of the piston to such position on the ejection of the soil core. A bulb planter is thus had which is simple, sturdy and efficient.

What I claim is:

1. A hand operated soil extracting implement for preparing a hole in the ground preparatory to planting, comprising: an elongated cylindrical barrel having a transversely extending handle secured adjacent to the upper end thereof; an annulus of downwardly extending inwardly curved tooth members forming the lower end of the implement, the perforate annular juncture zone of said tooth members with the barrel having a greater outside diameter than the adjacent lower end of the barrel, said curved teeth extending in a radially inward direction to provide an inner diameter less than the inner diameter of said barrel in the zone adjacent thereto, whereby owing to the perforate annular juncture the implement may be readily withdrawn from the soil, and owing to the incurved teeth the plug of soil thus removed is substantially loosely packed in the barrel and may be readily removed therefrom.

2. An implement as claimed in claim 1 having an annular depth gauge adjustably secured to the barrel thereof to provide a positive symmetrical limit to the penetration of the implement in the soil.

3. An implement as claimed in claim 1 including hand operated soil ejection means.

4. An implement as claimed in claim 3 including an injector operating handle secured to a piston within the implement and extending upwardly therefrom to extend beyond the upper end of the barrel.

5. An implement as claimed in claim 4 wherein said ejector operating handle is spring cushioned by means of a spring external to the upper end of said barrel extending axially outwardly in compressible relation with the ejector operating means.

6. An implement as claimed in claim 1 wherein said tooth members each have inward side flanges extending therefrom, being of reduced extent toward the point of the tooth.

References Cited by the Examiner

UNITED STATES PATENTS

| | | | |
|---|---|---|---|
| 944,393 | 12/1909 | Whitney | 294—50.5 |
| 1,672,095 | 6/1928 | Schacht | 294—50.5 |
| 2,014,311 | 9/1935 | Council | 294—50.5 X |

FOREIGN PATENTS 22,958  11/1905  Great Britain.

GERALD M. FORLENZA, *Primary Examiner.*

G. F. ABRAHAM, *Assistant Examiner.*